Aug. 27, 1935. H. L. ERICKSON ET AL 2,012,501
AUTOMATIC FILM UNIT ADVERTISING DEVICE
Filed Jan. 25, 1935 2 Sheets-Sheet 1
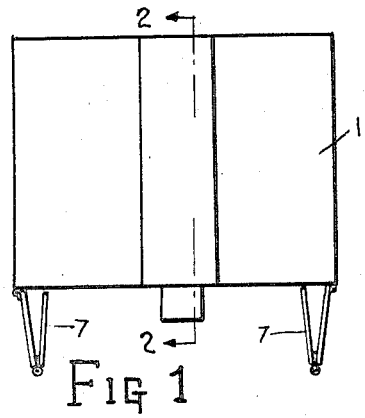
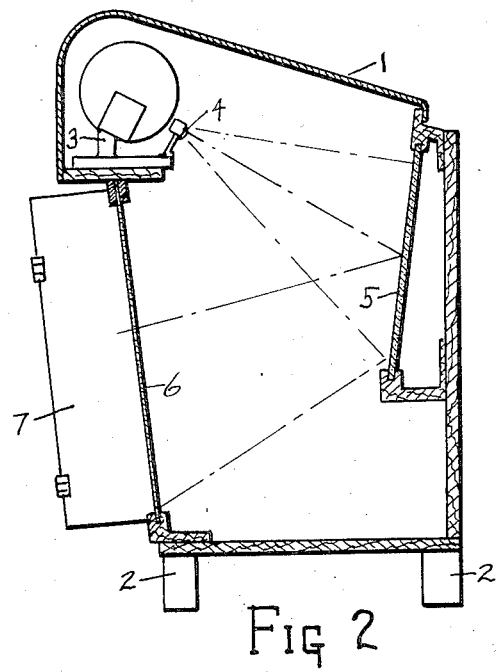
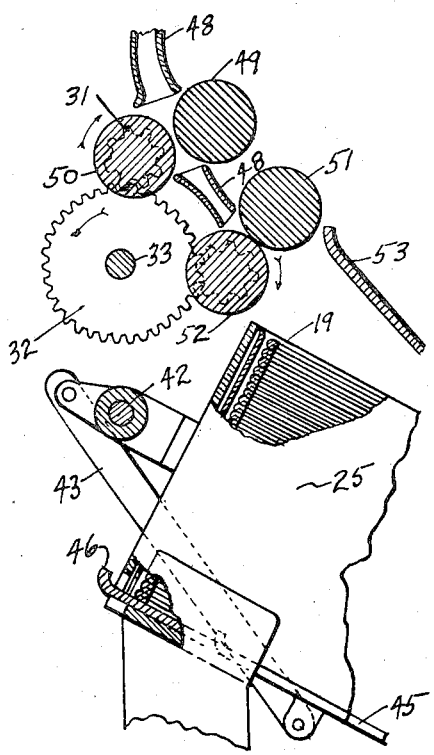
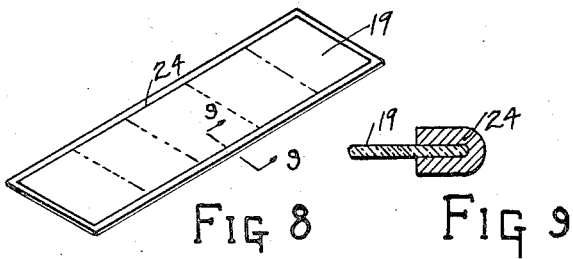
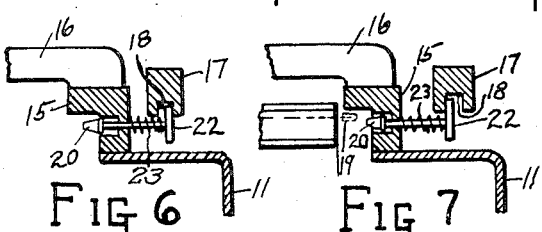
Henry L. Erickson &
Paul N. Moody
INVENTORS
BY
ATTORNEY.

Aug. 27, 1935.  H. L. ERICKSON ET AL  2,012,501

AUTOMATIC FILM UNIT ADVERTISING DEVICE

Filed Jan. 25, 1935  2 Sheets-Sheet 2

Henry L. Erickson &
Paul M. Moody
INVENTORS

BY
ATTORNEY.

Patented Aug. 27, 1935

2,012,501

UNITED STATES PATENT OFFICE 2,012,501

AUTOMATIC FILM UNIT ADVERTISING DEVICE

Henry L. Erickson and Paul N. Moody, Youngstown, Ohio

Application January 25, 1935, Serial No. 3,454

5 Claims. (Cl. 88—28)

This invention relates to film advertising devices.

The principal object of this invention is to provide a device using a plurality of film units automatically brought before a reflector in order to reflect film unit pictures or descriptive matter upon a screen.

A further object of the invention is to provide a shutter means for showing a day time advertisement.

A further object of the invention is to provide a film unit container and means for automatically moving the film units before a reflector.

A still further object is to provide means for automatically returning the film units to the film unit container in order that the pictures may be continued upon the screen.

Many devices have been constructed for outdoor advertising such as bill-boards and neon sentence signs in order to attract the attention of those passing the sign. It is the purpose of this invention to provide a means for reflecting pictures or descriptive matter upon a screen in order to more effectively call the attention of those passing the advertisement.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a top plan view of the device.

Figure 2 is a sectional view taken on line 2—2 of Figure 1.

Figure 5 is an enlarged detail of Figure 3 showing a film unit container and guiding means for returning the film to the film unit container.

Figure 6 is a cross section taken on line 6—6 of Figure 3.

Figure 7 is a cross section taken on line 7—7 of Figure 3.

Figure 8 is a perspective view of a film unit.

Figure 9 is a cross section taken on line 9—9 of Figure 8.

Figure 3:
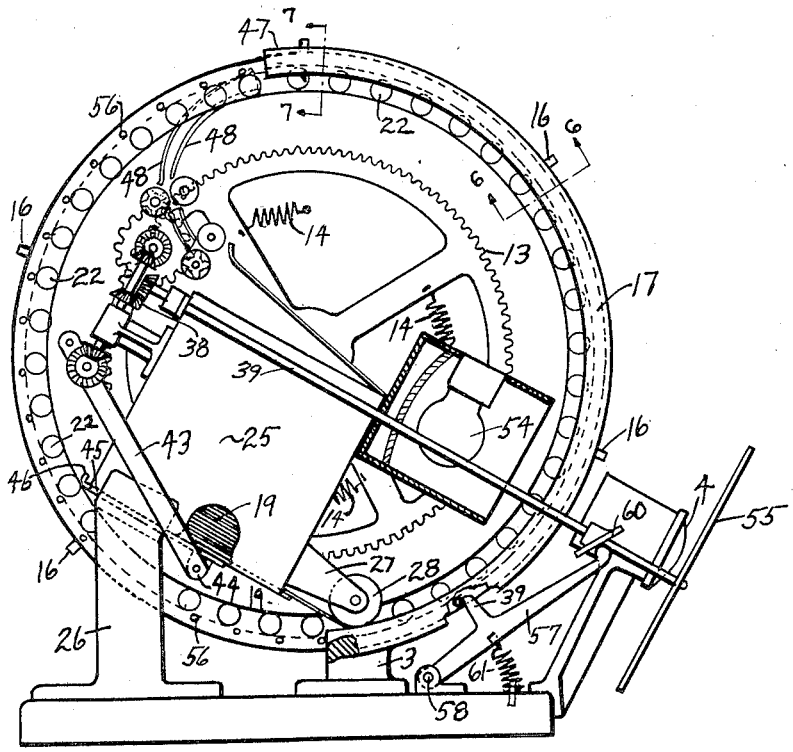
Figure 3 is an enlarged detail of a portion of Figure 2 showing the film unit movement mechanism.

By referring to the drawings it will be seen that there is provided a cabinet 1 suitably supported upon legs 2. By referring to Figure 2 it will be seen that the device is provided with a support member 3 for the purpose of supporting a film unit mechanism illustrated in Figures 3 and 4. It will be seen that there is provided a lens 4 through which the picture is projected upon an inclined reflector 5 which throws the picture upon a screen 6. By referring to Figure 1 it will be seen that this screen 6 may be covered by a hinged advertising bill-board 7 in order that the device may show an ordinary bill-board during the day time when the pictures are not being run.

Figure 4:
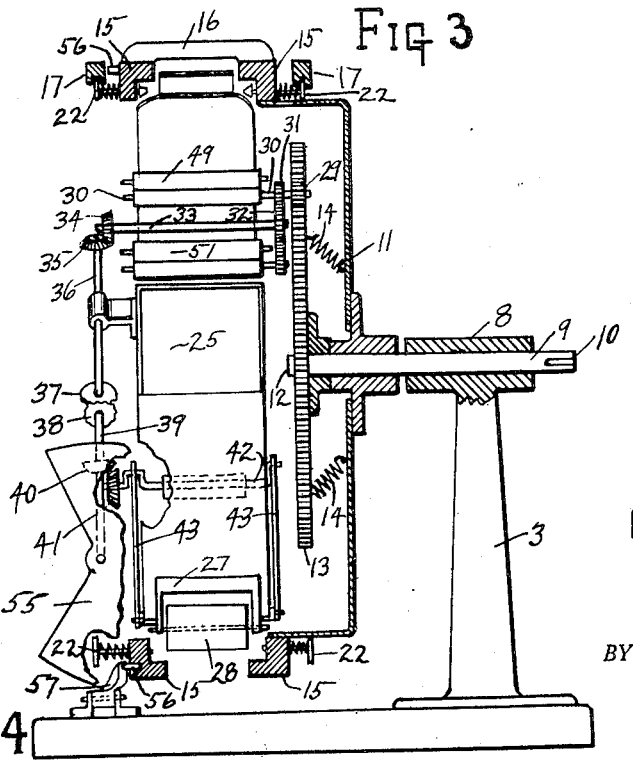
Figure 4 is a vertical end view of Figure 3 with parts broken away and partly in section in order to more clearly show the film unit movement mechanism.

By referring to Figures 3 and 4 it will be seen that the support member 3 is fitted with a head portion 8 carrying a shaft 9 which may be revolved by any suitable means by making attachment to an extreme outer end 10 of the shaft 9. This shaft 9 carries a free running drum 11 and near the opposite end 12 of the shaft 9 there is keyed a master gear 13. It will be seen that there is provided a plurality of coil springs 14, one end of each of which is attached to the interior of the free running drum 11 while the other ends are attached to the master gear 13. The purpose of these will be more clearly brought out as the description proceeds. It will also be seen that the free running drum 11 carries oppositely disposed film unit tracks 15 provided with bridge members 16. It will also be seen that there is provided a film unit clutch guide member 17. This film unit clutch guide member 17 is provided with a curved inner channel 18 so that film units 19 may be clutched by means of tapered clutch members 20. These tapered clutch members 20 are carried upon slidable pins 21, each having a head 22 traveling in the curved inner channel 18. The curvature in the channel 18 curves at each end of the film unit clutch guide member 17 where the same clutches outwardly. Figure 6 shows one of the tapered clutch members 20 in an extended clutched position, and Figure 7 shows one of the tapered clutch members 20 in a released position. By means of tension coil springs 23, the tapered clutch members 20 are held in a released position until they contact the curved inner channel 18 on the film unit clutch guide member 17.

By referring to Figures 8 and 9 it will also be seen that the film unit 19 is provided with a flexible frame member 24. By referring to Figure 3 it will be seen that there is provided a film unit container 25 which is positioned in an inclined manner and supported by a support means 26. There is attached to this film unit container 25 a bracket support member 27 carrying a feed roll 28.

In the operation of the device the shaft 9 is caused to revolve. This in turn revolves the master gear 13 which in turn engages a gear 29 carried upon a shaft 30. This shaft 30 carries a drive gear 31 which will move in a clockwise direction when the master gear 13 is rotated in an anti-clockwise direction. By referring to Figures 3 and 5 it will be seen that the drive gear 31 engages an idle gear 32 which is caused to revolve in an anti-clockwise direction. This idle gear 32 is carried upon a shaft 33. The other end of the shaft 33 carries a bevel gear 34 which in turn functions with a bevel gear 35 which is carried upon a shaft 36, supported by a bracket attached to the film unit container 25. It will be seen that the other end of the shaft 36 is provided with a bevel gear 37 which functions with a bevel gear 38 carried upon a shaft 39. This shaft 39 is also provided with a bevel gear 40 which in turn functions with a bevel gear 41 positioned upon a crank shaft 42.

By again referring to Figure 3 it will be seen that when the oppositely disposed film unit tracks 15 are caused to move in an anti-clockwise direction, the crank shaft 42 moves a pair of oppositely disposed crank arms 43. By referring to Figure 5 it will be seen that the lower ends 44 of the oppositely disposed crank arms 43 are attached in a pivoted manner to a film unit feed member 45 which is slideably maintained at the bottom of the film unit container 25. It will be seen that this film unit feed member 45 is provided with an upturned edge 46 so that as the same is caused to slide underneath the bottom film unit 19, the film unit is carried out and an outer end of the same is caught by the feed roll 28. This film unit is now clutched as above described by means of the tapered clutch members 20. When the film unit is carried to an extreme upper end 47 of the film unit clutch guide member 17, the film unit 19 slides in guide members 48 where the same is caused to pass between driven rolls 50 and 52 and idler rolls 49 and 51, where the same is guided into the film unit container 25 by means of a guide 53.

Of course, while the operation just given gives the movement of a single film unit, all of these film units 19 are carried in front of a light 54 and back of the lens 4. It is understood that the device must cause the film to momentarily stop before the lens 4, and then the movement away from the lens must take place when a shutter 55, carried upon the shaft 39 actuated by means of the bevel gear 38 secured to the outer end of the shaft 39, is closed.

It will be seen by referring to Figures 3 and 4 that there is provided a plurality of pins 56 spaced apart and positioned near the outer circumference on the oppositely disposed film unit tracks 15. It will also be seen that there is provided a cam controlled arm 57 hinged by means of a pivot 58, its upper end actuated by means of a cam 60 positioned upon the shaft 39. This cam controlled arm 57 is provided with a lug 58 which contacts the pins 56 in order to stop and release the oppositely disposed film unit tracks so that the film units will momentarily stop in front of the lens 4. This cam controlled arm 57 is held under tension by means of a compression spring 61.

It is obvious that each of these moving parts must be timed so as to perform these functions without stopping the continued movement of the master gear 13. It is also pointed out that the film container 25 is placed on an incline so that the taking out and putting in of the film units 19 may be more easily accomplished.

What we claim is:—

1. In a device of the class described comprising a casing, a reflector within said casing, a screen in front of said reflector, a plurality of film units, a container for holding said film units, a projection lens, means for moving said film units back of said projection lens, means for removing one at a time of said film units, means for momentarily stopping a film unit when back of said lens, said means comprising a master gear, a free running drum functioning with said master gear, coil springs functioning between said free running drum and said master gear, a plurality of pins on said free running drum, a cam controlled arm, a compression spring holding said cam controlled arm under tension, a lug on said cam controlled arm functioning with said plurality of pins on said drum, means for returning said film units to said film container, a hinged covering for said screen for the purpose of displaying a sign when film units are not being shown.

2. In a device of the class described comprising a casing, a reflector within said casing, a screen in front of said reflector, a hinged covering for said screen for the purpose of displaying a sign when film units are not being shown, a plurality of film units, a container for holding said film units, a projection lens, means for moving said film units back of said projection lens, said means comprising a drive shaft, a master gear mounted on said shaft, a free running drum functioning with said master gear, tapered clutch members mounted on said drum, a film unit clutch guide member, a curved inner channel in said film unit clutch guide member, a film unit feed member positioned on the bottom of said film unit container, and a feed roll, said tapered clutch members clutching said film units as they pass under said feed roll after leaving the film unit container and carrying them past the projection lens, means for momentarily stopping a film unit when back of said lens, and means for returning said film unit to said film container.

3. In a device of the class described comprising a casing, a reflector within said casing, a screen in front of said reflector, a plurality of film units, a container for holding said film units, a projection lens, a drive shaft, a master gear mounted on said shaft, a free running drum functioning with said master gear, tapered clutch members mounted on said drum, a film unit clutch guide member, a curved inner channel in said film unit clutch guide member, a film unit feed member positioned at the bottom of said film unit container, a feed roll, said tapered clutch members clutching said film units as they pass under said feed roll after leaving the film unit container and carrying them past the projection lens, coil springs functioning between said free running drum and said master gear, a plurality of pins on said free running drum, a cam controlled arm, a compression spring holding said cam controlled arm under tension, a lug on said cam controlled arm functioning with said plurality of pins on said drum for the purpose of momentarily stopping a film unit when back of said lens, means for returning said film units to said film container, a hinged covering for said screen for the purpose of displaying a sign when film units are not being shown.

4. In a device of the class described comprising a casing, a reflector within said casing, a screen in front of said reflector, a plurality of film units, a container for holding said film units, a projection lens, a drive shaft, a master gear mounted on said shaft, a free running drum functioning with said master gear, tapered clutch members mounted on said drum, a film unit clutch guide member, a curved inner channel in said film unit clutch guide member, a film unit feed member positioned at the bottom of said film unit container, a feed roll, said tapered clutch members clutching said film units as they pass under said feed roll after leaving the film unit container and carrying them past the projection lens, coil springs functioning between said free running drum and said master gear, a plurality of pins on said free running drum, a cam controlled arm, a compression spring holding said cam controlled arm under tension, a lug on said cam controlled arm functioning with said plurality of pins on said drum for the purpose of momentarily stopping a film unit when back of said lens, guide members at extreme upper end of said film unit clutch guide members for the purpose of receiving released film units, driven and idler rolls conveying said film units into said film unit container, and a guide for directing said film units into said film unit container, a hinged covering for said screen for the purpose of displaying a sign when film units are not being shown.

5. In a device of the class described comprising a casing, a reflector within said casing, a screen in front of said reflector, a plurality of film units, a container for holding said film units, a projection lens, a drive shaft, a master gear mounted on said shaft, a free running drum functioning with said master gear, tapered clutch members mounted on said drum, a film unit clutch guide member, a curved inner channel in said film unit clutch guide member, a film unit feed member positioned at the bottom of said film unit container, a feed roll, said tapered clutch members clutching said film units as they pass under said feed roll after leaving the film unit container and carrying them past the projection lens, coil springs functioning between said free running drum and said master gear, a plurality of pins on said free running drum, a cam controlled arm, a compression spring holding said cam controlled arm under tension, a lug on said cam controlled arm functioning with said plurality of pins on said drum for the purpose of momentarily stopping a film unit when back of said lens, guide members at extreme upper end of said film unit clutch guide members for the purpose of receiving released film units, rolls conveying said film units into said film unit container, and a guide for directing said film units into said film unit container.

HENRY L. ERICKSON.
PAUL N. MOODY.